US006919126B2

United States Patent
Wu et al.

(10) Patent No.: US 6,919,126 B2
(45) Date of Patent: Jul. 19, 2005

(54) LOW FIRING TEMPERATURE THICK FILM DIELECTRIC LAYER FOR ELECTROLUMINESCENT DISPLAY

(75) Inventors: Li Wu, Brampton (CA); Ahn Sung-II, Mississauga (CA); Yang Maizhi, North York (CA); Wu Xinguei, Brampton (CA); Lee Seong-Eui, Mississauga (CA); Daniel J. Seale, Toronto (CA); William M. Smy, Bolton (CA); Yufeng Ye, Toronto (CA); Zhang Hui, Scarborough (CA)

(73) Assignee: IFIRE Technology Inc., Fort Saskatchewan (CA)

( * ) Notice: Subject to any disclaimer, the term of this patent is extended or adjusted under 35 U.S.C. 154(b) by 139 days.

(21) Appl. No.: 10/326,777

(22) Filed: Dec. 19, 2002

(65) Prior Publication Data

US 2004/0247858 A1 Dec. 9, 2004

Related U.S. Application Data

(60) Provisional application No. 60/341,790, filed on Dec. 21, 2001.

(51) Int. Cl.[7] .................................................. B32B 9/00
(52) U.S. Cl. ........................ 428/323; 428/701; 428/702; 428/336; 428/426; 428/690; 428/917; 427/402; 427/372; 427/66
(58) Field of Search ........................ 428/323, 701, 428/702, 426, 336, 690, 917; 427/402, 372, 66

(56) References Cited

U.S. PATENT DOCUMENTS

| 5,702,565 A | 12/1997 | Wu et al. |
| 5,814,571 A | 9/1998 | Kawakami et al. |
| 6,452,309 B1 * | 9/2002 | Takeuchi et al. ............ 310/331 |
| 6,800,322 B2 * | 10/2004 | Takeishi et al. .............. 427/64 |

FOREIGN PATENT DOCUMENTS

WO     WO 00/70917     5/2000

* cited by examiner

Primary Examiner—Dawn Garrett
(74) Attorney, Agent, or Firm—Fay, Sharpe, Fagan, Minnich & McKee, LLP (57) ABSTRACT

The present invention is a low firing temperature, composite thick film dielectric layer for an electroluminescent display. The composite thick film dielectric layer comprises;

(a) a lower zone layer of a thick film composition comprising;
one or more of lead magnesium niobate (PMN), lead magnesium niobate-titanate (PMN-PT), lead titanate, barium titanate and lead oxide; and
a glass frit composition comprising lead oxide, boron oxide and silicon dioxide;

(b) an upper zone comprising at least one layer of lead zirconate titanate (PZT) and/or barium titanate; and (c) an intermediate composite zone comprising a composite of (a) and (b).

46 Claims, 2 Drawing Sheets

LOW FIRING TEMPERATURE THICK FILM DIELECTRIC LAYER FOR ELECTROLUMINESCENT DISPLAY

This application claims the benefit of provisional application No. 60/341,790, filed Dec. 21, 2001.

FIELD OF THE INVENTION

The present invention relates generally to electroluminescent displays and more particularly to a low firing temperature, composite thick film dielectric layer for an electroluminescent display and to an electroluminescent display incorporating the same.

BACKGROUND OF THE INVENTION

Thick dielectric electroluminescent (TDEL) displays provide a great advance in flat panel display technology. TDEL displays comprise a basic structure including a ceramic or other heat resistant substrate upon which an electrically conductive film is deposited to define a set of row electrodes. A thick film dielectric layer consisting of a ferroelectric material overlies the row electrodes and is sandwiched between the electrically conductive film and a thin film structure. The thin film structure includes one or more thin film dielectric layers sandwiching one or more phosphor films. A set of optically transparent column electrodes is deposited on the thin film structure. The entire basic structure is covered with a sealing layer to protect the thick and thin film dielectric layers from degradation due to moisture and/or other atmospheric contaminants.

The composite dielectric layers used in these TDEL displays have a high dielectric constant, allowing the use of relatively thick dielectric layers in the TDEL displays without a significant increase in the display operating voltage. However, the dielectric breakdown strength of these dielectric materials is relatively low, necessitating the use of a relatively thick dielectric layer, typically greater than 10 micrometers, to prevent dielectric breakdown during display operation. Typically, the thick film dielectric layer comprises a sintered perovskite piezoelectric or ferroelectric material such as lead magnesium niobate (PMN) or lead magnesium niobate-titanate (PMN-PT) with a dielectric constant of several thousand. There may also be a thinner overlayer of a compatible plezoelectric or ferroelectric material such as lead zirconate titanate (PZT) applied using metal organic deposition (MOD) or sol gel techniques to smooth the surface of the thick film dielectric layer in preparation for deposition of the thin film structure.

Typically, the thick film dielectric layer is sintered at about 850° C. onto an alumina substrate onto which thin film gold row electrodes have been deposited. This yields a sintered thick film dielectric layer having a density that is sufficiently high that the remaining porosity, particularly in the upper portion of the thick film dielectric layer can be filled using sol gel or MOD techniques. If the thick film dielectric layer is sintered at temperatures lower than 850° C., the residual porosity of the thick film dielectric layer after firing is increased. This makes it more difficult to smooth the surface of the thick film dielectric layer using a sol gel or MOD process, and tends to reduce the dielectric constant and dielectric strength of the composite dielectric layer.

Using glass material (i.e. glass or glass ceramic) substrates that are commercially available in large areas is of course desired in order to reduce TDEL manufacturing costs. However, if such a glass material substrate is used, the softening temperature of the glass material substrate must not be exceeded during the sintering process in order to avoid warping of the glass material substrate. Since the softening temperature of glass material substrates is near 650° C., sintering must be carried out at temperatures below 650° C. but by doing so, the above-described problems are encountered. As a result, known thick film dielectric layers remain incompatible with glass material substrates.

It is therefore an object of the present invention to provide a novel low firing temperature thick film dielectric layer for an electroluminescent display and to an electroluminescent display incorporating the same.

SUMMARY OF THE INVENTION

The present invention is a composite thick film dielectric layer that can be sintered onto a glass material substrate at temperatures below the softening temperature of the glass material substrate without significantly increasing the residual porosity of the thick film dielectric layer after firing or reducing the dielectric constant and dielectric strength of the thick film dielectric layer. As a result, large area commercially available glass material substrates can be effectively used in the production of TDEL displays.

According to an aspect of the present invention is a composite thick film dielectric layer that can be formed on a glass substrate such that mechanical defects such as cracks and voids are minimized and the composite has acceptably low pyrochlore content to achieve adequate dielectric breakdown strength and high dielectric constant. It is preferred that the substrate have a thermal expansion coefficient of about $4 \times 10^{-6}/°$ C. to $10 \times 10^{-6}/°$ C. and more preferably a thermal expansion coefficient of about $5.5 \times 10^{-6}/°$ C. to $9 \times 10^{-6}/°$ C. This range of thermal expansion helps to ensure that the composite thick dielectric layer will not crack. Suitable substrates are known in the art and include but are not limited glass, glass ceramics and ceramics.

According to another aspect of the present invention is a composite thick film dielectric layer that facilitates the use of low cost glass substrates and thus the economic feasibility of making TDEL displays employing such. Furthermore, the composite thick film dielectric layer improves the strength of the dielectric layer per se and reduces the incidence of dielectric breakdown of the TDEL device when incorporated therein.

The composite thick film dielectric layer comprises essentially three zones which together provide the aforementioned desired and beneficial structural and functional properties for use in a TDEL display. Both the upper and lower zone are made of individual compositions. In particular, the lower zone is an admixture of two compositions, a precursor thick film composition and glass frit composition, while the upper zone is a smoothing composition. The intermediate zone is developed as a result of sintering of the upper and lower zone at temperatures of up to about 650° C. The intermediate zone improves the entire performance of the composite thick film dielectric layer within a TDEL display.

According to yet a further aspect of the invention is a sintered composite thick film dielectric layer comprising a lower zone of predominantly PMN or PMN-PT, an upper zone of PZT or barium titanate and an intermediate zone comprising a composite of PMN or PMN-PT and PZT or barium titanate. The intermediate zone provides strength to the thick film dielectric layer and thus helps to reduce dielectric breakdown. The intermediate zone also helps to facilitate the distribution of stress within the entire thick dielectric film and to reduce the density of defects.

In accordance with an aspect of the present invention, there is provided a sintered composite thick film dielectric layer comprising;

(a) a lower zone layer of a thick film composition comprising;
one or more of lead magnesium niobate (PMN), lead magnesium niobate-titanate (PMN-PT), lead titanate, barium titanate and lead oxide;
a glass frit composition comprising lead oxide, boron oxide and optionally silicon dioxide;

(b) an upper zone comprising at least one layer of lead zirconate titanate (PZT) and/or barium titanate; and (c) an intermediate composite zone comprising a composite of (a) and (b).

In a further embodiment of the present invention, the composite thick film dielectric layer can itself be layered to provide a multi-layered composite. In other words, the resultant composite thick film dielectric layer can be present as a single layer or multiple layers thereof so long as the overall thickness of the composite thick film dielectric does not exceed about 10 microns in thickness. Such a multi-layered composite will be understood to have several intermediate composite zones. A multi-layered composite provides for overall periodic variation in the structure which may further improve the strength, stability and conductivity as incorporated within a TDEL display.

According to another aspect of the present invention there is provided a thick film precursor composition comprising:
about 85–95% by weight lead magnesium niobate (PMN) or lead magnesium niobate-titanate (PMN-PT) powder,
up to about 10% by weight barium titanate powder, and up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain site not greater than about 50 to 100 nanometers, wherein said precursor composition is suitable for making a thick film composition which can be used to make a composite thick film dielectric layer for a TDEL display. The precursor composition is admixed with a compatible glass frit composition and vehicle to provide a thick film composition for deposition on a glass material substrate.

In a preferred embodiment between about 20–30% of the barium titanate powder has a grain size not greater than about 50 nanometers. It is also preferred that the thick film dielectric composition further comprises up to about 8% by weight lead oxide powder having a grain size in the range of from about 0.2 to 1 micrometers to compensate for lead oxide evaporated from the thick film paste during sintering.

According to still another aspect of the present invention there is provided a thick film composition for forming a composite thick film dielectric layer in an electroluminescent display having a glass material substrate, said thick film composition comprising:
about 85–95% by weight lead magnesium niobate (PMN) or lead magnesium niobate-titanate (PMN-PT) powder having a grain size in the range of from about 0.2 to 1 micrometers;
up to 10% by weight barium titanate powder, at least 20% of said barium titanate powder having a grain less than about 50 nm and the remainder of said barium titanate having a grain size in the range of from about 0.2 to 1 micrometers;
up to 15% by weight lead titanate powder having a grain size in the range of from about 0.2 to 1 micrometers;
a glass fit composition having a grain size in the range of from about 0.2 to 1 micrometers; and
a vehicle to bind the powders and said glass frit composition.

The thick film composition being suitable for layering onto a glass substrate for subsequent drying, sintering and deposition of at least one layer of a smoothing layer comprising PZT and/or barium titanate and further subsequent sintering at temperatures of up to about 650° C.

The glass frit composition is preferably a pre-homogenized or mixed powder comprising about 87–94% by weight lead oxide, about 6–9% by weight boron oxide and up to about 6% by weight silicon dioxide so as to form a solid solution at a temperature above about 550° C. The amount of silicon dioxide is preferably 4 to 6%. The total weight of the glass frit composition is from about 1–8% of the weight of the PMN or PMN-PT powder. The glass frit composition may also comprise additional additives such as but not limited to small quantities of aluminum oxide, zinc oxide, calcium oxide and mixtures thereof.

The vehicle preferably comprises a solvent and a polymer binder. The vehicle may optionally include viscosity and surface tension modifying agents to allow the thick film dielectric paste to be deposited on a glass material substrate and form a thick dielectric film of the desired thickness and uniformity.

The smoothing composition comprises lead zirconate titanate (PZT) and/or a barium titanate layer. The smoothing composition is applied as a precursor smoothing composition which upon sintering at suitable temperatures of up to about 650° C. forms the PZT layer that acts to help fill any pores present on the thick film composition deposited on the glass substrate. The smoothing composition can be deposited on the thick film composition by a sol-gel process or MOD process. In a preferred aspect, the smoothing composition is applied as several thin layers on the top of the thick film composition.

According to another aspect of the present invention is a method for making a thick film composition, said method comprising combining the following:
about 85–95% by weight lead magnesium niobate (PMN) or lead magnesium niobate-titanate (PMN-PT) powder having a grain size in the range of from about 0.2 to 1 micrometers;
up to 10% by weight barium titanate powder, at least 20% of said barium titanate powder having a grain less than about 50 nm and the remainder of said barium titanate having a grain size in the range of from about 0.2 to 1 micrometers;
up to 15% by weight lead titanate powder having a grain size in the range of from about 0:2 to 1 micrometers;
a glass frit composition having a grain size in the range of from about 0.2 to 1 micrometers; and
a vehicle to bind the powders and said glass frit composition.

The thick film composition is suitable for deposition as a single layer or multiple layers onto a desired glass substrate, for subsequent sintering at temperatures of about 650° C.

According to still a further aspect of the present invention is a method for making a thick film precursor composition, said method comprising admixing:
about 85–95% by weight lead magnesium niobate (PMN) or lead magnesium niobate-titanate (PMN-PT) powder,
up to about 10% by weight barium titanate powder; and
up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 to 100 nanometers.

According to a further aspect of the present invention is a method for making a composite thick film dielectric layer, said method comprising the steps of:

a) providing a composition comprising:

about 85–95% by weight lead magnesium niobate (PMN) or lead magnesium niobate-titanate (PMN-PT) powder;

up to about 10% by weight barium titanate powder; and up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 nanometers;

b) providing a glass frit comprising:

about 87–94% lead oxide;

about 6 to 9% boron oxide;

about up to 6% silicon dioxide; wherein the grain size of said glass frit composition is about 0.2 to 1.0 microns, and c) mixing the composition of a) with about 1 to 8% of the composition of b) and a suitable vehicle to bind the powders and said glass fit composition;

d) layering c) onto a suitable glass substrate and drying;

e) sintering d) at a temperature of up to about 650° C.; and f) applying at least one smoothing layer to e) and sintering at temperatures of up to about 650° C.

According to another embodiment of the present invention is a TDEL display incorporating a composite thick film dielectric layer of the present invention.

According to yet a further embodiment of the present invention is a TDEL display incorporating a multilayered composite thick film dielectric layer of the present invention. In this embodiment, two or more layers of the thick film dielectric layer are provided within the TDEL display.

In either of the two aforementioned embodiments, the substrate of the TDEL display may comprise a glass material and more specifically glass or glass ceramic. As is understood by one of skill in the art, the present composite thick film dielectric layer and multilayered composite thick film dielectric layer may be incorporated within a TDEL display having a ceramic substrate.

According to an aspect of the present invention is a thick dielectric electroluminescent display comprising;

a substrate comprising a material selected from the group consisting of glass, glass ceramic and ceramic;

a lower electrode layer directly adjacent said substrate, said lower electrode layer comprising an electrically conductive metallic film;

one or more layers of a composite thick film dielectric layer adjacent an upper surface of said electrode layer, said composite layer comprising;

(a) a lower zone layer of a thick film composition comprising;

one or more of lead magnesium niobate (PMN), lead magnesium niobate-titanate (PMN-PT), lead titanate, barium titanate and lead oxide;

a glass frit composition comprising lead oxide, boron oxide and silicon dioxide;

(b) an upper zone comprising at least one layer of lead zirconate titanate (PZT) and/or barium titanate; and (c) an intermediate composite zone comprising a composite of (a) and (b);

a phosphor film deposited on said thick film dielectric layer; and an upper electrode layer comprising an optically transparent electrically conductive film.

According to still a further aspect of the present invention is a thick dielectric electroluminescent display comprising;

a substrate;

a lower electrode layer directly adjacent said substrate, said lower electrode layer comprising an electrically conductive metallic film;

one or more layers of a composite thick film dielectric layer adjacent an upper surface of said electrode layer, said composite layer comprising;

(a) a lower zone layer of a thick film composition comprising;

one or more of lead magnesium niobate (PMN), lead magnesium niobate-titanate (PMN-PT), lead titanate, barium titanate and lead oxide;

a glass frit composition comprising lead oxide, boron oxide and silicon dioxide;

(b) an upper zone comprising at least one layer of lead zirconate titanate (PZT) and/or barium titanate; and (c) an intermediate composite zone comprising a composite of (a) and (b);

a phosphor film deposited on said thick film dielectric layer; and an upper electrode layer comprising an optically transparent electrically conductive film.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the description given herein, and from the accompanying drawings, which are given by way of illustration only and do not limit the intended scope of the invention wherein.

DETAILED DESCRIPTION OF THE PREFERRED EMBODIMENTS

The present invention is a low firing temperature, composite thick film dielectric layer suitable for use in an electroluminescent display having a glass material substrate that can be sintered onto the glass material substrate at temperatures of about 200° C. below sintering temperatures required for thick dielectric layers disclosed in the prior art. This temperature reduction facilitates the use of relatively low cost glass material substrates with softening temperatures near 650° C. that are commercially available in large areas and therefore, facilitates the fabrication of large area electroluminescent displays. Since the thick film dielectric layer permits sintering at reduced temperatures, the glass material softening temperature is not exceeded thereby avoiding deformation of the glass material substrate during display processing.

Figure 1:
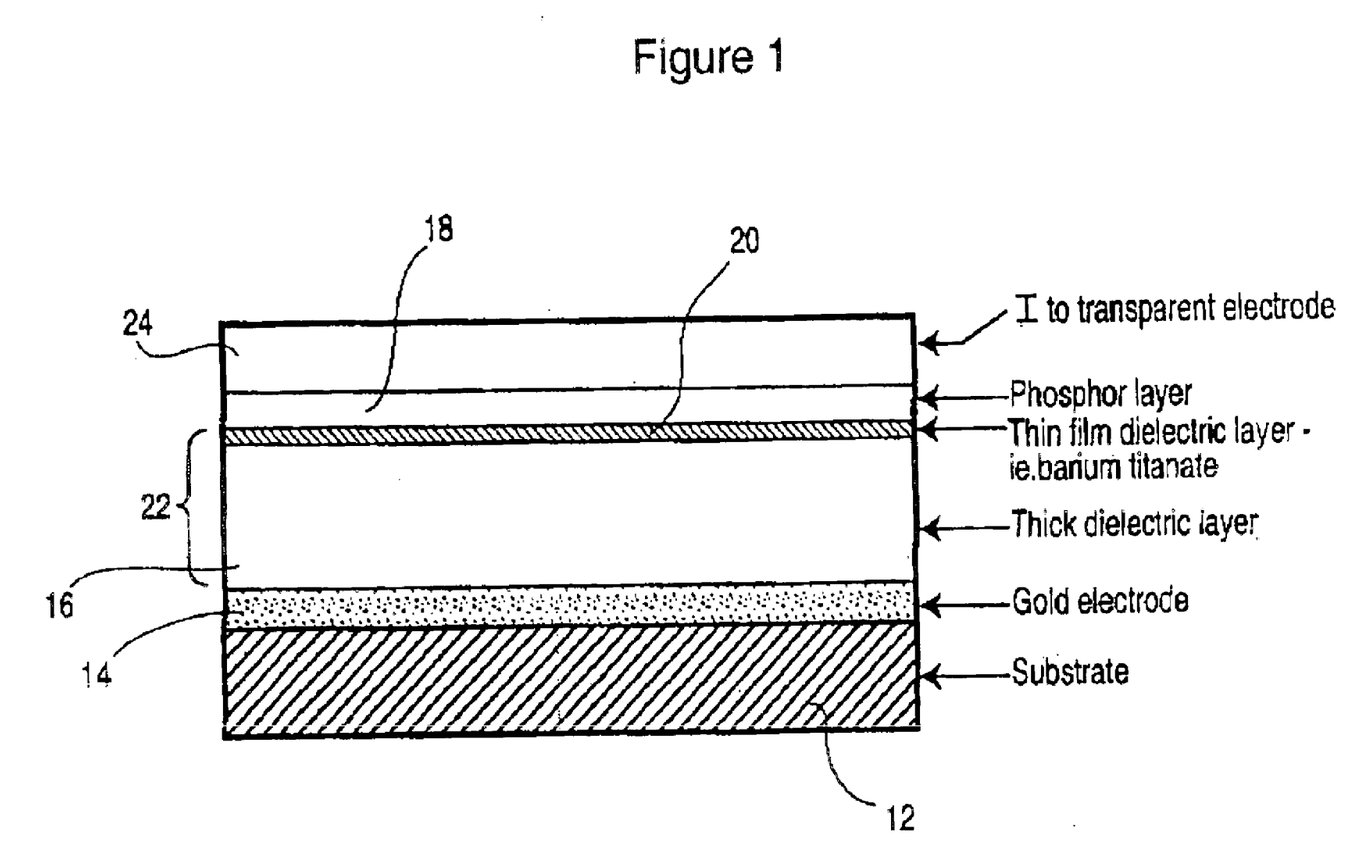
FIG. 1 shows a section of a portion of a thick film electroluminescent display of the present invention and FIG. 2 shows a partial ternary phase diagram for the lead oxide/boron oxide/silicon oxide system.

Turning now to FIG. 1, a portion of a thick film electroluminescent display of the present invention is shown. As can be seen, the electroluminescent display includes a glass material (i.e. glass or glass ceramic) substrate 12. The glass material substrate 12 is preferably low cost and commercially available in large areas and typically has a softening temperature near about 650° C. An electrically conductive gold film 14 is deposited on the glass substrate 12 to define a set of row electrodes. A thick film dielectric layer 16 overlies the row electrodes and is sandwiched between the electrically conductive film 14 and a thin film structure 18. The thin film structure 18 includes one or more thin film dielectric layers and one or more phosphor films. A smoothing layer 20 is provided on the upper portion of the thick film dielectric layer 16. The thick film dielectric layer 16 and the smoothing layer 20 form a composite thick film dielectric layer 22. A transparent ITO film 24 is deposited on the thin film structure 18 to define a set of column electrodes. The entire basic structure is covered with a sealing layer (not shown) to protect the thick and thin film dielectric layers from degradation due to moisture and/or other atmospheric contaminants.

The thick film dielectric layer 16 comprises a thick film dielectric composition, a glass frit composition and a vehicle to bind the thick film dielectric composition and the glass frit composition. This enables the thick film dielectric layer to be applied onto the glass material substrate 12 as a paste. The paste can then be sintered at temperatures of up to about 650° C.

The thick film dielectric composition preferably comprises one or more perovskite-forming precursor powders selected from lead magnesium niobate (PMN), lead magnesium niobate-titanate (PMN-PT), lead titanate, and barium titanate. Lead oxide (PbO) powder may optionally be included to compensate for lead oxide evaporated from the thick film dielectric composition during sintering or heat treatment steps.

The glass frit composition preferably comprises lead oxide, boron oxide and silicon oxide and has a melting temperature below about 550° C.

The vehicle preferably comprises a solvent and a polymer binder to hold the deposited thick film dielectric layer together prior to sintering. Viscosity and surface tension modifying agents may optionally be included in the vehicle to allow deposition of a thick film dielectric layer 16 of the required thickness and thickness uniformity using the selected deposition method. Deposition methods include screen-printing, spraying, and roll coating. Suitable agents such as the aforementioned solvents, polymer binders, viscosity and surface tension modifying agents for use in the invention are well known to those of skill in the art.

The perovsklte-forming precursor powders may be included in the thick film dielectric composition in different proportions. The major phase is preferably PMN or PMN-PT and is present at between about 85 and 95% of the total thick film dielectric composition weight. The remaining perovskite-forming precursor powders may be present in the following weight percentages:

| barium titanate | up to about 10% |
| lead oxide | up to about 8% |
| lead titanate | up to about 15% |

The glass frit composition may be present as a pre-homogenized or mixed powder comprising lead oxide, boron oxide ($B_2O_5$), and silicon oxide ($SiO_2$) in approximately the following weight percentages:

| lead oxide | about 87 to 94% |
| boron oxide | about 6% to 9% |
| silicon dioxide | up to about 6% |

Figure 2:
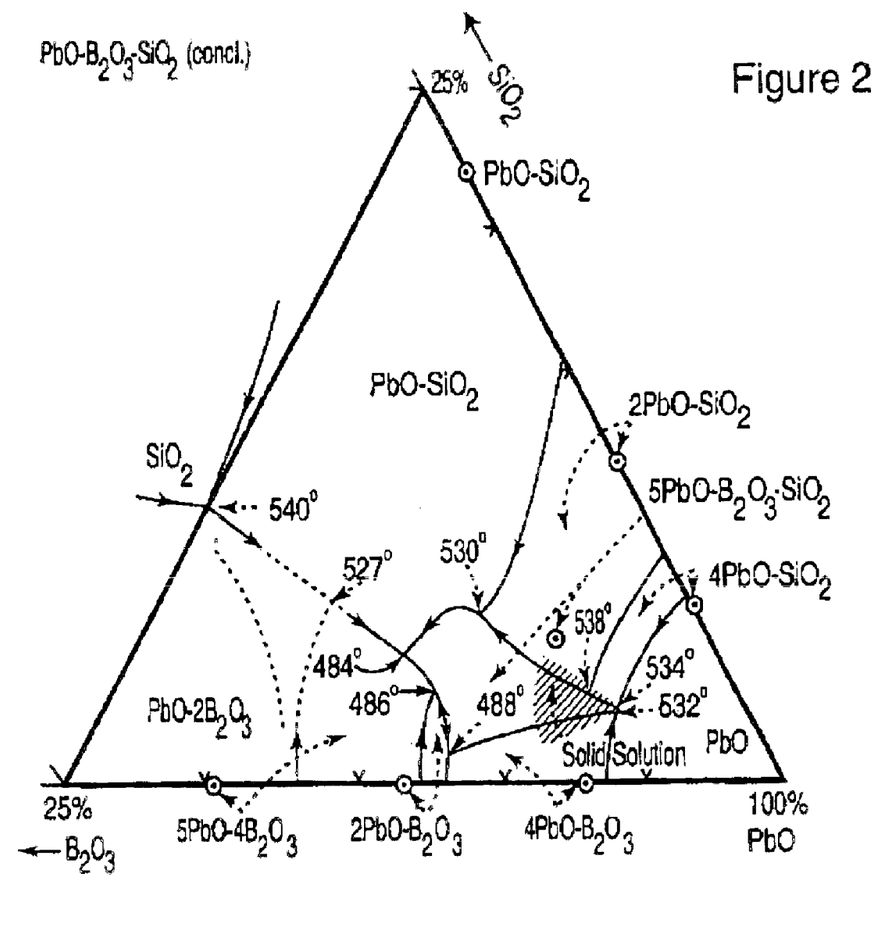

The lead oxide, boron oxide and silicon dioxide powders form a solid solution above about 550° C. The total weight of the glass frit composition is from about 1% to 8% of the weight of PMN or PMN-PT. The partial ternary phase diagram for the lead oxide/boron oxide/silicon wide dioxide system of the glass frit composition is shown in FIG. 2.

The grain size of the perovskite-forming precursor powders and the glass frit composition powders should be about one micron or less and larger than about 0.2 microns on average with the following exception. The grain size of approximately 20 to 30% of the barium titanate powder should be about 50 to 100 nanometers and more preferably about up to 50 nanometers to ensure that it is adequately dispersed within the sintered thick film dielectric layer.

The vehicle is formulated to provide appropriate deposition properties, and does not have a significant effect on the properties of the sintered thick film dielectric layer provided that the constituent elements are burned or volatilized off as the deposited films are heated prior to sintering. However, the properties of the vehicle are important in achieving the deposition of defect free layers, as is the milling time of the paste to reduce the size of the particulates in the paste. The viscosity, as well as the solid-to-liquid ratio of the paste, are important parameters in determining an optimum paste for defect free printing or deposition. The optimum viscosity and solid-to-liquid fraction are different for deposition on glass material substrates than they are for deposition on ceramic substrates, possibly because of differences in their micro-roughness.

In formulating the thick film dielectric composition there are a number of trade-offs to consider. As the sintering temperature is lowered, the porosity of the sintered thick film dielectric layer increases since the sintering process is further from completion. Further, the fraction of pyrochlore phase in the sintered thick film dielectric layer tends to be higher. The present invention enables achievement of a composite thick film dielectric layer that can be formed on a glass material substrate without mechanical defects such as cracks and voids and that also has acceptably low pyrochlore content to respectively achieve adequate dielectric breakdown strength and a high dielectric constant. This is achieved by a judicious choice of chemical composition and physical properties of the thick film dielectric paste used to form the thick film dielectric layer 16. The selected composition of the thick film dielectric paste is of course dependent on the glass material composition to the extent that chemical species from the glass material interdiffuse with or react with the thick film dielectric layer 16.

Barium titanate added as a powder to the PMN or PMN-PT powder has been found to increase the dielectric breakdown strength of capacitors formed by depositing a metal electrode on top of the composite thick film dielectric layer 22. When thick film dielectric electroluminescent devices are fabricated using these composite thick film dielectric layers, the incidence of dielectric breakdown in the electroluminescent devices when they are driven with a repeating sequence of alternating polarity voltage pulses has been found to be markedly reduced. While the reason for the improvement is not fully understood, it is presumed that the addition of barium titanate powder reduces the defect density in the thick film dielectric layer, possibly by suppressing unwanted phases such as compounds with the pyrochlore structure that may have a low dielectric constant. A composite structure with component materials, some being ferroelectric and others with a low dielectric constant would be expected to have a positive or negative charge present at boundaries between the two types of phases, in accordance with electromagnetic theory as applied to dielectric materials. Such accumulated charge may be associated with chemically active sites, and, if an electric field is present, might nucleate dielectric breakdown. Suppression of phases with low dielectric constant may therefore reduce the probability of dielectric breakdown. Another possibility is that different crystal or amorphous phases within the composite dielectric have different thermal expansion properties, and during temperature cycling associated with device fabrication may cause the development of mechanical stress within the structure, leading to crystal or structural defects that may be associated with dielectric breakdown. Furthermore, it is possible that the intrinsic breakdown strength of barium titanate infused PMN or PMN-PT powder may be higher than that of pure PMN or PMN-PT, to help improve the overall breakdown strength. The reasons dielectric breakdown and the improvement noted with the addition of barium titanate powder to the thick film dielectric paste, however, may be other than those given above.

The smoothing layer 20 preferably includes several thin layers deposited on the thick film dielectric layer 16 using sol gel or MOD techniques. The sol gel or MOD thin layers can be formulated to provide a lead zirconate titanate (PZT) smoothing layer 20 as described in Applicant's copending Patent Application PCT/CA00/00561 (the contents of which are incorporated herein by reference) and/or a barium titanate layer as described in Applicant's co-pending U.S. patent application Ser. No. 09/761,971 filed on Jan. 17, 2001 (the contents of which are incorporated herein by reference). Briefly, the smoothing layer is provided as a precursor smoothing solution containing PZT. Upon sintering at suitable temperatures, the smoothing solution reacts with the thick layer composition to help fill any pores and/or voids and forms the intermediate zone and the PZT upper layer. The behaviour of the MOD solution used to deposit the MOD layer is significantly different for glass material substrates than it is for the alumina substrates described in the prior art. These differences are in part due to the different thick film dielectric firing temperatures used for the different substrate materials The optimum MOD solution viscosity is different for different substrate materials.

Addition of the MOD thin layers can significantly alter the properties of the underlying thick film dielectric layer, especially if it is incompletely sintered. Although the PZT smoothing layer 20 nominally has a lower dielectric constant than the thick film dielectric layer 16, the deposition and firing at 650° C. of thin PZT smoothing layers on top of the thick film dielectric layer 16 is observed to increase the capacitance per unit area of the composite thick film dielectric layer 22 as measured by sandwiching it between conductive electrodes, especially if the thick film dielectric layer 16 is fired at temperatures below 850° C., particularly near about 650° C. Further increases in capacitance are observed if additional thin layers of PZT are deposited and sequentially fired. This is counter to the expectation of a reduction in capacitance as the thickness of the composite thick film dielectric layer 22 is increased using a material with a lower dielectric constant. Thus, the MOD deposition steps aid in further sintering of the composite thick film dielectric layer 22 as the MOD layers are applied and help achieve the objective of developing a composite thick film structure with a high dielectric constant that can be processed at temperatures not exceeding 650° C. It is expeditious to apply several very thin MOD layers rather than one or two MOD layers to achieve the desired final thickness to maximize the capacitance.

In a second embodiment of the present invention, the sintered composite thick film dielectric layer 22 may also be further layered upon itself to provide further periodic variation within the entire dielectric structure. In this manner a first composite thick film dielectric layer is deposited and sintered, then a second composite thick film dielectric layer is deposited on the first layer and so on as desired. It is understood by one of skill in the art that the individual layers can be made of varying thickness so long as the overall thickness of the thick film dielectric structure is about 10 microns.

The dielectric breakdown strength of the composite thick film dielectric layer is related to the detailed chemical and physical structure of the composite layer. Dielectric breakdown typically initiates at defects-or anomalies in the film. The probability of a dielectric breakdown event is dependent on the number of defects present, and therefore on the area of the electroluminescent display of which it is a part. It may be affected by the nature of layers immediately adjacent to the composite thick film dielectric layer, the distribution of stress within the composite layer and the environment, particularly the moisture level to which an electroluminescent display containing the dielectric layer is subjected.

In accordance with the present invention, the composite thick film dielectric layer is fabricated by first depositing and sintering a PMN or PMN-PT based paste onto a glass material substrate to form a thick film dielectric layer and then applying a PZT smoothing layer 20 deposited using a metal organic deposition (MOD) process to have a composite structure. The composition of this composite layer near the juncture with the glass material substrate is predominantly derived from the initially deposited PMN or PMN-PT and the composition near its upper surface is predominantly PZT. In the intervening zone these two materials intermingle and react to form a composite thick film dielectric layer that yields increased dielectric strength.

The mechanical integrity of electroluminescent devices constructed using the present invention are dependent to an extent on the physical properties of the glass material substrate, particularly the thermal expansion coefficient of the substrate. The thermal expansion coefficient should be in the range of about $4 \times 10^{-6}/°$ C. to $10 \times 10^{-6}/°$ C., and preferably in the range of about $5.5 \times 10^{-6}/°$ C. to $9 \times 10^{-6}/°$ C. If the thermal expansion coefficient of the substrate material is too low with respect to that of the composite thick film dielectric layer, the dielectric layer may crack.

In summary, the composite thick film dielectric layer of the present invention provides increased dielectric and mechanical strength and thus is an improvement in the reliability of electroluminescent displays. It also enables the thickness of the thick film dielectric layer to be reduced thus, saving costs, and provides an ability to achieve higher display luminosity by concentrating the available applied voltage across the phosphor layer.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

The following examples detail the fabrication of and test results for electroluminescent elements incorporating the composite thick film dielectric composition of the present invention.

Example 1

With reference to FIG. 1, an electroluminescent device was constructed on a 5 centimeter by 0.5 centimeter by 5 centimeter thick PP8C glass substrate obtained from Nippon Electric Glass Co. Ltd. Of Osaka, Japan using the general methods described in U.S. patent application Ser. No. 09/540,288 in combination with the methods described herein. The device had a barium titanate barrier layer between the thick dielectric layer as described in Applicant's co-pending U.S. patent application Ser. No. 09/761,971 filed Jan. 17, 2001 (the contents of which are incorporated herein by reference) and a 0.5 micron thick zinc sulfide phosphor layer. The lower electrode was gold and the upper transparent electrode was indium tin oxide (ITO).

The thick film dielectric paste was formulated with perovskite-forming powdered precursor materials including 600 grams of PMN obtained from Ferro of (Niagara Falls, N.Y. USA), 18 grams of lead oxide, 20 grams of lead titanate and 20 grams of barium titanante, all with a typical particle diameter of about one micrometer and an additional 6 grams of barium titanate obtained from TPL of (Albuquerque, N.Mex., USA) with a particle diameter of about 50 nanometers. The precursor materials were blended into a slurry consisting of a solution of 140 grams of alpha-terpineol, 5 grams of acetone, 4 grams of Emphos PS-220 (obtained from Witco of Houston, Tex.) and 4 grams of di-n-butyl phthalate into which 15 grams of CF 7589 glass frit (obtained from Ferro Electronic Materials of 4511 Hyde Park Blvd. Niagara Falls, N.Y. USA) was added and milled for about two hours until the frit particle size was reduced to about one micrometer. Upon addition of the precursor materials, the resulting slurry was further milled for an additional two hours and then passed through a 10 micrometer filter to remove large particles. The milling was carried out using a zirconia 3 mm ball mill to minimize contamination. To the filtered slurry was added vehicle consisting of 1 to 3% ethyl cellulose in α-terpineol to adjust the viscosity to between 30 and 5000 centipoise. The average size of the particles (D50) as measured by a Microtrac particle size analyzer in the milled slurry was 0.63 micrometers.

The thick film dielectric paste was screen-printed on the gold patterned glass substrate. The printed substrate was dried at between 120° C. and 200° C. A second layer was printed and dried, then the deposited film was cold isostatically pressed according to the methods described in Applicant's co-pending PCT/CA00/00561 (the contents of which are incorporated herein by reference) and then fired using a belt furnace at a peak sintering temperature of 650° C. for about 30 minutes to form a thick film layer about 10 micrometers thick.

Next, two layers of lead zirconate-titanate (PZT) yielding MOD solution spin coated on the thick film layer also using the methods disclosed in Applicant's co-pending Patent Application PCT/CA00/00561 (the contents of which are incorporated herein by reference) and fired at 650° C. to form a layer between 0.3 and 1.8 micrometers thick after firing. The composition of the MOD solution for the first layer was adjusted so that the viscosity was 10 centipoise. The thickness of the first layer was 0.5 micrometers. The thickness measurement was made using x-ray fluorescence on a MOD samples deposited and fired on a glass substrate and it is recognized that the actual thickness on the thick film layer was different due to the surface roughness and porosity of the thick film. The viscosity of the MOD solution was adjusted to within the range 20 to 40 centipoise and the thickness of the second layer using the same measuring technique was about 1.5 micrometers.

Following deposition of the PZT layers a barium titanate thin film layer 50 to 100 nanometers thick was deposited using the methods described in Applicant's Patent Application PCT/CA00/00561 (the contents of which are incorporated herein by reference) and fired also at 650° C. A phosphor layer consisting of ZnS:Mn was deposited on the barium titanate layer, an upper thin film dielectric layer comprising a 50 nanometer thick alumina layer and an indium tin oxide transparent conductor film were deposited in sequence to form the device. The device was tested by applying an alternating polarity pulsed voltage waveform of amplitude 220 volts with a pulse duration of 32 microseconds and a pulse repetition rate of 240 Hz. The luminance of the device was measured to be 3000cd/m$^2$ and no dielectric breakdown occurred.

Example 2

An electroluminescent device was constructed as in Example 1, except that the ratio of alpha terpineol to the other ingredients in the milled slurry was increased by about 65% and the milling time following the addition of the perovskite-forming precursor materials was 6 hours rather than 2 hours. For this device the thick film layer after firing was 13 micrometers thick and the PZT layer was between 0.3 to 1.8 micrometers thick. Under the same testing conditions as for Example 1, the luminance was measured to be about 3000 cd/m$^2$ and no dielectric breakdown occurred.

Example 3

An electroluminescent device was constructed similar to that in Example 2, except that CF7567 frit rather than CF7583 frit from Ferro Electronic Materials was added to the paste formulation. The CF 7567 frit differs from the CF 7583 frit in that CF7583 has a softening temperature of 372° C. and a sealing temperature of 480° C., and CF7567 has a softening temperature of 358° C. and a sealing temperature of 420° C. The performance of the device was similar to that of Example 2.

Example 4

An electroluminescent device as in Example 2 was constructed, except that EG2012 frit from Ferro Electronic Materials was used in place of CF7583 frit. EG2012 frit differs from CF7583 frit in that EG2012 has a softening temperature of 350° C. and a sealing temperature of 410° C. The performance of the device was similar to that of Example 2.

Example 5

An electroluminescent device as in Example 1 was constructed, except that the slurry following the addition of the perovskite-forming precursor materials was 16 hours rather than 2 hours. This reduced the average particle size (D50) as measured with a Microtrac analyzer to 0.51. The performance of this device was similar to that of Example 1.

Example 6

An electroluminescent device as in Example 1 was constructed, except that the amount of lead titanate in the perovskite-forming precursor mix was increased from 20 grams to 60 grams. The luminance of this device was slightly lower than that for Example 1.

Example 7

An electroluminescent device as in Example 1 was constructed, except that the amount of lead oxide in the perovskite-forming precursor mix was increased from 18 grams to 27 grams. The luminance of this device was slightly lower than for Example 1.

Example 8

An electroluminescent device was constructed as in Example 2, except that barium titanate was not added as a perovskite forming precursor mix. The performance of this device was that the dielectric breakdown voltage was somewhat lower than that for Example 2.

Example 9

An electroluminescent device was constructed as in Example 2, except that the amount of one micron sized barium titanate powder added to the perovskite-forming precursor mix was 36 grams rather than 20 grams. The luminance of this device was slightly lower than that in Example 2.

Example 10

An electroluminescent device was constructed as in Example 2, except that the amount of glass frit added to the paste slurry was 36 grams rather than 15 grams. The luminance of this device was slightly lower than that in Example 2.

Example 11

An electroluminescent device was constructed as in Example 1, except that the substrate was a glass ceramic material with a thermal coefficients of expansion (TCE) of $6.4 \times 10^{-6}/°$ C. rather than PP8C glass. The PP8C glass has a TCE of $8.2 \times 10^{-6}$/C. The device had performance similar to that of Example 1. Another device constructed on a PD200 glass substrate material obtained from Asahi Glass Electronic Materials of Hillsboro, or having a TCE of $7.9 \times 10^{-6}/°$ C also has a similar performance to that of Example 1.

Example 12

Three electroluminescent devices were constructed as in Example 1, except that two substrates were glass ceramic materials containing silicon aluminum, magnesium, zinc and titanium oxides with respective TCEs of $3.6 \times 10^{-6}/°$ C., $4.0 \times 10^{-6}/°$ C., and the third substrate was a glass ceramic material containing lithium, aluminum and silicon oxides with a TCE less than $1 \times 10^{-6}/°$ C. The thick dielectric structure was observed to be cracked after processing, indicating that the TCE of the glass was not in the correct range.

Example 13

An electroluminescent device was constructed as in Example 1, except that the thick film layer prior to PZT deposition was 17 micrometers thick, the MOD solution used to deposit the first and second PZT layers had a viscosity of 20 centipoise, the thickness of the first PZT layer was 0.8 micrometers and the thickness of the second PZT layer was 0.6 micrometers. This process provided a device with more holes within the composite dielectric structure by microscopic examination than that of Example 1. This device also had a loss tangent (dielectric loss factor at a frequency of 1000 Hz for the composite dielectric layer about ten times higher than that of the device of Example 1 and a more gradual turn-on of luminance as the driving voltage was increased as compared to the device of Example 1. The loss tangent was measured by depositing a conductive electrode directly on top of the thick dielectric rather than the thin film phosphor-containing structure for an electroluminescent device, and measuring the complex electrical impedance of the resulting capacitor. Although the performance of this device was inferior to that of the device in Example 1, The MOD process used to make it is advantageous in that it facilitates the use of more air-stable MOD solutions.

Example 14

A multi-layered composite structure was fabricated using alternate layers of sintered PMN layers and sol gel or MOD derived PZT layers which improve the strength, stability and performance of an electroluminescent device as fabricated on a glass substrate. The improvement is believed attributable to a further sintering of the PMN layers while the PZT layers are fired. The multi-layered structure affords more intimate contact and greater interaction between the PMN and the PZT precursor materials to further sinter the PMN and reduce porosity of the composite dielectric structure to reduce the incidence of cracks and improve its resistance to dielectric breakdown when it is incorporated into a TDEL device.

With reference to FIG. 1, an electroluminescent device was constructed on a five centimeter by 5 centimeter by 1.8 millimeter thick PD200 glass substrate obtained from Asahi Glass of Hillsboro, Oreg., USA using the general methods described in Applicant's U.S. patent application Ser. No. 09/540,288 (the entirety of which is incorporated herein by reference) in combination with the methods described herein. The device has a barium titanate layer between a multi-layered composite thick dielectric layer as described in Applicant's co-pending U.S. patent application Ser. No. 09/761,971 filed Jan. 17, 2001 (the contents of which are incorporated herein by reference) and a 0.5 micron thick manganese activated zinc sulfide phosphor layer. The lower electrode was 0.9 micrometer thick gold formed by printing and firing TR1207gold-containing paste from Tanaka Kikinzoku International of Tokyo, Japan and the upper electrode was indium tin oxide.

The multi-layered composite thick dielectric layer was formed by the following process. A first thick film layer of thickness about 5 micrometers similar to that described in example 1 was printed on the substrate on which the lower electrode had been applied, densified by compression and fired in the range of 700° C. to 720° C. for about 18 minutes. The thick film paste for this layer was prepared using a mixture of PMN powders, one with a particle size distribution characterized as having a d50 of 0.45 micrometers and a d90 of 0.63 and the other with a particle size distribution characterized as having a d50 of 0.36 micrometers and a d90 of 0.63. The powders were mixed in a weight ratio of about 1.14:1 and used to formulate the pastes as described in example 1. The powders were prepared by grinding in a planetary ball mill for 2 hours and 16 hours respectively. Next, a 0.5 micrometer thick layer of PZT was deposited and fired at about 700° C. for about 7 minutes. The PZT was deposited using the MOD process described in Example 1, but with the MOD solution adjusted to have a viscosity in the range of about 9 to 15 centipoise.

A second thick film layer, also of thickness of about 5 micrometers was then deposited onto the first thick film layer to form the multi-layered composite thick dielectric. A second 0.5 micrometer thick layer of PZT using the same process as for the second step, was deposited onto the second thick film layer. A third layer of PZT was applied using the same process to increase the thickness of the topmost PZT layer to about 1 micrometer. During the repeated firings in this process, intermixing and interdiffusion of the PMN and PZT layers occurred. It was observed that the completed dielectric structure was free of cracks when examined under a microscope.

The completed TDEL device was tested using the test procedure defined in example 1, but with a voltage amplitude of 60 volts above the threshold voltage of 154 volts measured for the device. The luminance was about 3900 candelas per square meter with a high degree of uniformity.

Example 15

The following example illustrates that the instant invention provides benefits for reduction of dielectric cracks in TDEL displays processed on ceramic substrates as well as on glass substrates. As with the device of example 14, a multi-layered composite thick dielectric layer was constructed incorporating two thick film layers. The first layer was fired at a lower temperature than the second layer to avoid over-firing of the first layer since it is subjected to a greater number of firings. With the thick film paste formulation used for low temperature firing, it was noted that firing at high temperature for an excessively long period of time caused a reduction in the effective dielectric constant of the dielectric layer, leading to reduced device performance.

The TDEL device was constructed on a 5 centimeter by 5 centimeter 1 millimeter thick alumina substrate patterned with a gold lower electrode. The multi-layered composite thick dielectric layer was formed on the patterned substrate using a process similar to that of example 14. The first thick film layer was printed with CL90–7239 from Heraeus Incorporated of Conshohocken, Pa. and had a thickness of about 9 micrometers. It was densified and fired at 600° C. for about 15 minutes. Next a PZT layer was applied using the MOD process with the viscosity of the MOD solution adjusted to about 20 centipoise. The nominal thickness of this layer was about 1 micrometer as determined by x-ray fluorescence on a similar layer deposited but not dried on a glass substrate. Next a second thick film layer was printed, densified and fired at a temperature of 850° C. for 15 minutes. Following this two more layers of PZT were applied as for example 14. The dielectric layer was observed to be free of cracks when viewed under a microscope.

A barium titanate layer 100 to 200 nanometers thick was deposited as described in example 14 on top of the dielectric layer, followed by a 400 nanometer europium activated barium thioaluminate phosphor layer using the methods of U.S. patent application Ser. No. 09/798,203 (the entirety of which is incorporated herein by reference). On top of this, a 50 nanometer thick alumina layer and an indium tin oxide upper electrode layer were deposited to complete the device.

The device was tested using the method of example 1 and the luminance was measured to be 146 candelas per square meter. Also, the, device did not break down when a voltage of up to at least 300 volts was applied.

Although preferred embodiments of the invention have been described herein in detail, it will be understood by those skilled in the art that variations may be made thereto without departing from the spirit of the invention as defined by the appended claims.

What is claimed is:

1. A composite thick film dielectric layer comprising:
   (a) a lower zone layer of a thick film composition comprising:
      one or more of lead magnesium niobate (PMN), lead magnesium niobate-titanate (PMN-PT), lead titanate, barium titanate and lead oxide;
      a glass frit composition comprising lead oxide, boron oxide and silicon dioxide; and
   (b) an upper zone comprising at least one layer of lead zirconate titanate (PZT) and/or barium titanate; and
   (c) an intermediate composite zone comprising a composite of (a) and (b).

2. The composite thick film dielectric layer of claim 1, wherein said lower zone comprises:
   about 85–95% by weight lead magnesium niobate (PMN) or lead magnesium niobate-titanate (PMN-PT) powder;
   up to 10% by weight barium titanate powder;
   up to 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 to 100 nanometers;
   a glass frit composition having a grain size in the range of from about 0.2 to 1 micrometers; and
   a vehicle to bind the powders and said glass frit composition.

3. The composite thick film dielectric layer of claim 2 wherein between 20–30% of the barium titanate powder has a grain size of not greater than about 50 to 100 nanometers.

4. The composite thick film dielectric layer of claim 3 wherein between about 20–30% of the barium titanate powder has a grain size not greater than about 50 nanometers.

5. The composite thick film dielectric layer of claim 4, wherein said glass frit composition comprises a pre-homogenized or mixed powder comprising about 87–94% by weight of lead oxide, about 6–9% by weight boron oxide and up to 6% by weight silicon dioxide.

6. The composite thick film dielectric layer of claim 5, wherein said glass frit composition comprises 4 to 6% by weight silicon dioxide.

7. The composite thick film dielectric layer of claim 6, wherein said glass composition forms a solid solution at a temperature above about 550° C.

8. The composite thick film dielectric layer of claim 7, wherein said glass frit composition further comprises an additive selected from the group consisting of aluminum oxide, zinc oxide, calcium oxide and mixtures thereof.

9. The composite thick film dielectric layer of claim 2, wherein said vehicle comprises one or more agents selected from the group consisting of solvent, polymer binder and viscosity and surface tension modifying agents.

10. The composite thick film dielectric layerof claim 2, further comprising up to about 8% by weight lead oxide powder having a grain size in the range of from about 0.2 to 1 micrometer.

11. The composite thick film dielectric layer of claim 1, wherein said composite is provided as a single layer or multiple layers.

12. The composite thick film dielectric layer of claim 11, wherein said composite is provided on a substrate having a thermal expansion coefficient of about $4 \times 10^{-6}/°C$ to about $9 \times 10^{-6}/°C$.

13. The composite thick film dielectric layer of claim 12, wherein said composite is provided on a substrate having a thermal expansion coefficient of about $5.5 \times 10^{-6}/°C$ to about $9 \times 10^{-6}/°C$.

14. The composite thick film dielectric layer of claim 12, wherein said substrate comprises a substrate material selected from the group consisting of glass, glass ceramic and ceramic.

15. A method for making a composite thick film dielectric layer, said method comprising the steps of:
  a) providing a composition comprising:
    about 85–95% by weight lead magnesium niobate (PMN) or lead niobate-titanate (PMN-PT) powder;
    up to about 10% by weight barium titanate powder; and
    up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 to 100 nanometers;
  b) providing a glass frit comprising:
    about 87 to 94% lead oxide;
    about 6 to 9% boron oxide;
    about up to 6% silicon dioxide; wherein the grain size of said glass frit composition is about 0.2 to 1.0 microns,
  c) mixing the composition of a) with about 1 to 8% of the composition of b) and a vehicle to bind the powders and said glass frit composition;
  d) layering C) onto a suitable glass substrate and drying;
  e) sintering d) at a temperature of up to about 650° C.; and
  f) applying at least one smoothing layer to e) and sintering at temperatures of up to about 650° C.

16. The method of claim 15, wherein said smoothing layer contains PZT.

17. A thick film precursor composition comprising:
  about 85–95% by weight lead magnesium niobate (PMN) or lead magnesium niobate-titanate (PMN-PT) powder;
  up to about 10% by weight barium titanate powder; and
  up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 to 100 nanometers.

18. A thick film precursor composition according to claim 17, wherein between about 20–30% of the barium titanate powder has a grain size not greater than about 50 nanometers.

19. A thick film precursor composition according to claim 18 further comprising about 8% by weight lead oxide powder having a grain size in the range of from about 0.2 to 1 micrometer.

20. A thick film composition for making a composite thick film dielectric layer in an electroluminescent display having a glass substrate, said composition comprising:
  about 85–95% by weight lead magnesium niobate (PMN) or lead magnesium niobate-titanate (PMN-PT) powder having a grain size in the range of from about 0.2 to 1 micrometers;
  up to 10% by weight barium titanate powder, at least 20% of said barium titanate powder having a grain less than about 50 to 100 nm and the remainder of said barium titanate having a grain size in the range of from about 0.2 to 1 micrometers;
  up to 15% by weight lead titanate powder having a grain size in the range of from about 0.2 to 1 micrometers;
  a glass frit composition having a grain size in the range of from about 0.2 to 1 micrometers; and
  a vehicle to bind the powders and said glass frit composition.

21. A thick film composition of claim 20, further comprising up to about 8% by weight lead oxide powder having a grain size in the range from about 0.2 to 1 micrometer.

22. A thick film composition of claim 21 wherein between 20–30% of the barium titanate powder has a grain size not greater than about 50 nanometers.

23. A thick film composition of claim 22, wherein said glass frit composition is a pre-homogenized or mixed powder comprising about 87–94% by weight lead oxide, about 6–9% by weight boron oxide and about 4–6% by weight silicon dioxide.

24. A thick film composition of claim 20, wherein the total weight of said glass frit composition is from about 1–8% by weight of the PMN or PMN-PT powder.

25. A thick film composition of claim 20, wherein said vehicle comprises an agent selected from the group consisting of solvent, polymer binder, and viscosity and surface tension modifying agents.

26. A method for making a thick film composition, said method comprising the steps of:
  a) providing a composition comprising:
    about 85–95% by weight lead magnesium niobate (PMN) or lead magnesium niobate-titanate (PMN-PT) powder;
    up to about 10% by weight barium titanate powder; and
    up to about 15% by weight lead titanate powder, wherein the PMN or PMN-PT powder and the lead titanate powder have grain sizes in the range of from about 0.2 to 1 micrometers and wherein at least about 20% of the barium titanate powder has a grain size not greater than about 50 to 100 nanometers;
  b) providing a glass frit comprising:
    about 87 to 94% lead oxide;
    about 6 to 9% boron oxide;
    about up to 6% silicon dioxide; wherein the grain size of said glass frit composition is about 0.2 to 1.0 microns, and
  c) mixing the composition of a) with about 1 to 8% of the composition of b).

27. The method of claim 26, wherein the method further comprises mixing said glass frit composition with a vehicle prior to the mixing of compositions a) and b).

28. The method of claim 27, wherein said vehicle comprises an agent selected from the group consisting of a solvent, a polymer binder and a viscosity and surface tension modifying agent and mixtures thereof.

29. The method of claim 28, further comprising sintering said composition onto a substrate at a temperature of up to about 650° C.

30. The method of claim 29, wherein said substrate has a thermal expansion coefficient of about $4 \times 10^{-6}/°C$ to about $10 \times 10^{-6}/°C$.

31. The method of claim 30, wherein said substrate has a thermal expansion coefficient of about $5.5 \times 10^{-6}/°C$ to about $9 \times 10^{-6}/°C$.

32. The method of claim 30, wherein said substrate is a material selected from the group consisting of glass, glass ceramic and ceramic.

33. A thick film dielectric electroluminescent display incorporating a composite of claim 1.

34. A thick film dielectric electroluminescent display comprising:
 a substrate;
 a lower electrode layer directly adjacent said substrate, said lower electrode layer comprising an electrically conductive metallic film;
 a first layer of a composite thick film dielectric layer of claim 1 adjacent an upper surface of said electrode layer;
 a phosphor film deposited on said thick film dielectric layer; and
 an upper electrode layer comprising an optically transparent electrically conductive film.

35. The display of claim 34, wherein said substrate comprises a material having a thermal expansion coefficient of about $4 \times 10^{-6}/°$ C. to about $10 \times 10^{-6}/°$ C.

36. The display of claim 34, wherein said display further comprises a second layer of a composite thick film dielectric layer sintered onto said first layer.

37. The display of claim 36, wherein said lower zone has a thickness of up to about 9 micrometers.

38. The display of claim 37, wherein the upper zone of said second layer of said composite thick film dielectric layer comprises two layers of PZT.

39. The display of claim 38, wherein said PZT layers have a thickness of about 1 micrometer.

40. The display of claim 39, wherein said display further comprises a barium titanate layer on top of said PZT layers of said second layer of said composite thick film dielectric layer.

41. The display of claim 40, wherein said barium titanate layer has a thickness of about 100 nm to 200 nm.

42. The display of claim 41, wherein said phosphor film is an europium activated barium thioaluminate.

43. The display of claim 42, wherein said phosphor film has a thickness of about 400 nm.

44. The display of claim 34, wherein said electrically conductive film comprises indium tin oxide.

45. The display of claim 34, wherein said substrate comprises a material selected from the group consisting of glass, glass ceramic and ceramic.

46. A thick film dielectric laminate comprising:
 two or more layers of the composite of claim 1.

* * * * *

UNITED STATES PATENT AND TRADEMARK OFFICE
CERTIFICATE OF CORRECTION

PATENT NO. : 6,919,126 B2
DATED : July 19, 2005
INVENTOR(S) : Li Wu et al.

It is certified that error appears in the above-identified patent and that said Letters Patent is hereby corrected as shown below:

<u>Title page,</u>
Item [75], Inventors, should read
-- Li Wu, Brampton (CA); Ahn Sung-II, Mississauga (CA); Yang Maizhi, North York (CA); Wu Xingwei, Brampton (CA); Lee Seong-Eui, Mississauga (CA); Daniel J. Seale, Toronto (CA); William M. Smy, Bolton (CA); Yufeng Ye, Toronto (CA); Zhang Hui, Scarborough (CA) --.

Signed and Sealed this

Twenty-second Day of November, 2005

JON W. DUDAS
*Director of the United States Patent and Trademark Office*